United States Patent
Kretschmar et al.

(10) Patent No.: US 9,246,185 B2
(45) Date of Patent: Jan. 26, 2016

(54) ELECTROCHEMICAL CELL HAVING A FOLDED ELECTRODE AND SEPARATOR, BATTERY INCLUDING THE SAME, AND METHOD OF FORMING SAME

(71) Applicants: Sion Power Corporation, Tucson, AZ (US); Robert Bosch GmbH, Stuttgart (DE)

(72) Inventors: Thomas Kretschmar, Bamberg (DE); Thomas Wöhrle, Stuttgart-Feuerbach (DE); Martin Tenzer, Unterensingen (DE); Nathan Jessen Crum, Marana, AZ (US); Ernest Dezso Botos, Vail, AZ (US); Lowell Dale Jones, Tucson, AZ (US)

(73) Assignees: Sion Power Corporation, Tucson, AZ (US); Robert Bosch GmbH, Stuttgart (DE)

( * ) Notice: Subject to any disclaimer, the term of this patent is extended or adjusted under 35 U.S.C. 154(b) by 316 days.

(21) Appl. No.: 13/830,942

(22) Filed: Mar. 14, 2013

(65) Prior Publication Data

US 2014/0272537 A1    Sep. 18, 2014

(51) Int. Cl.
| | |
|---|---|
| *H01M 6/42* | (2006.01) |
| *H01M 10/04* | (2006.01) |
| *H01M 2/18* | (2006.01) |
| *H01M 2/26* | (2006.01) |
| *H01M 10/0583* | (2010.01) |

(52) U.S. Cl.
CPC ............ *H01M 10/0431* (2013.01); *H01M 2/18* (2013.01); *H01M 2/263* (2013.01); *H01M 10/0583* (2013.01); *H01M 10/0404* (2013.01); *H01M 10/045* (2013.01); *H01M 10/0459* (2013.01); *Y10T 29/49108* (2015.01)

(58) Field of Classification Search
CPC .................... H01M 10/045; H01M 10/0459
See application file for complete search history.

(56) References Cited

U.S. PATENT DOCUMENTS

| | | | |
|---|---|---|---|
| 6,423,449 | B1 | 7/2002 | Hong |
| 6,679,926 | B1 | 1/2004 | Kajiura et al. |
| 6,997,228 | B2 | 2/2006 | Hong |
| 7,033,701 | B2 | 4/2006 | Hong |
| 7,500,304 | B2 | 3/2009 | Hong |
| 8,197,971 | B2 | 6/2012 | Skotheim et al. |
| 2002/0034688 | A1 | 3/2002 | Chu et al. |

(Continued)

FOREIGN PATENT DOCUMENTS

| | | |
|---|---|---|
| JP | 09017441 A | 1/1997 |
| JP | H09-017441 A | 1/1997 |

(Continued)

OTHER PUBLICATIONS

International Search Report & Written Opinion in PCT Patent Application No. 2014/022821.

(Continued)

*Primary Examiner* — Jane Rhee
(74) *Attorney, Agent, or Firm* — Snell & Wilmer L.L.P.

(57) ABSTRACT

An electrochemical cell including a folded electrode layer and a folded separator, a battery including the electrochemical cell, and methods of forming the electrochemical cell and battery are disclosed. The electrode layer is folded in a first direction and the separator is folded in a second direction, such that the first direction and second direction are orthogonal each other.

45 Claims, 15 Drawing Sheets

(56) References Cited

U.S. PATENT DOCUMENTS

| | | |
|---|---|---|
| 2002/0122987 A1 | 9/2002 | Tamura et al. |
| 2009/0053592 A1 | 2/2009 | Mino et al. |
| 2009/0311598 A1 | 12/2009 | Tadano |
| 2010/0221588 A1 | 9/2010 | Marple |
| 2011/0183203 A1 | 7/2011 | Du et al. |
| 2012/0208066 A1 | 8/2012 | Schaefer et al. |

FOREIGN PATENT DOCUMENTS

| | | |
|---|---|---|
| JP | 11-040202 A | 2/1999 |
| JP | 2003-123743 A | 4/2003 |
| JP | 2005-174653 A | 6/2005 |
| JP | 2011-138675 A | 7/2011 |
| WO | 2009078632 A2 | 6/2009 |
| WO | 2011020545 A1 | 2/2011 |

OTHER PUBLICATIONS

International Search Report & Written Opinion in PCT Patent application No. 2014/022831.

USPTO; Restriction Requirement dated Mar. 12, 2015 in U.S. Appl. No. 13/831,266.

USPTO; Office Action dated Jun. 18, 2015 in U.S. Appl. No. 13/831,266.

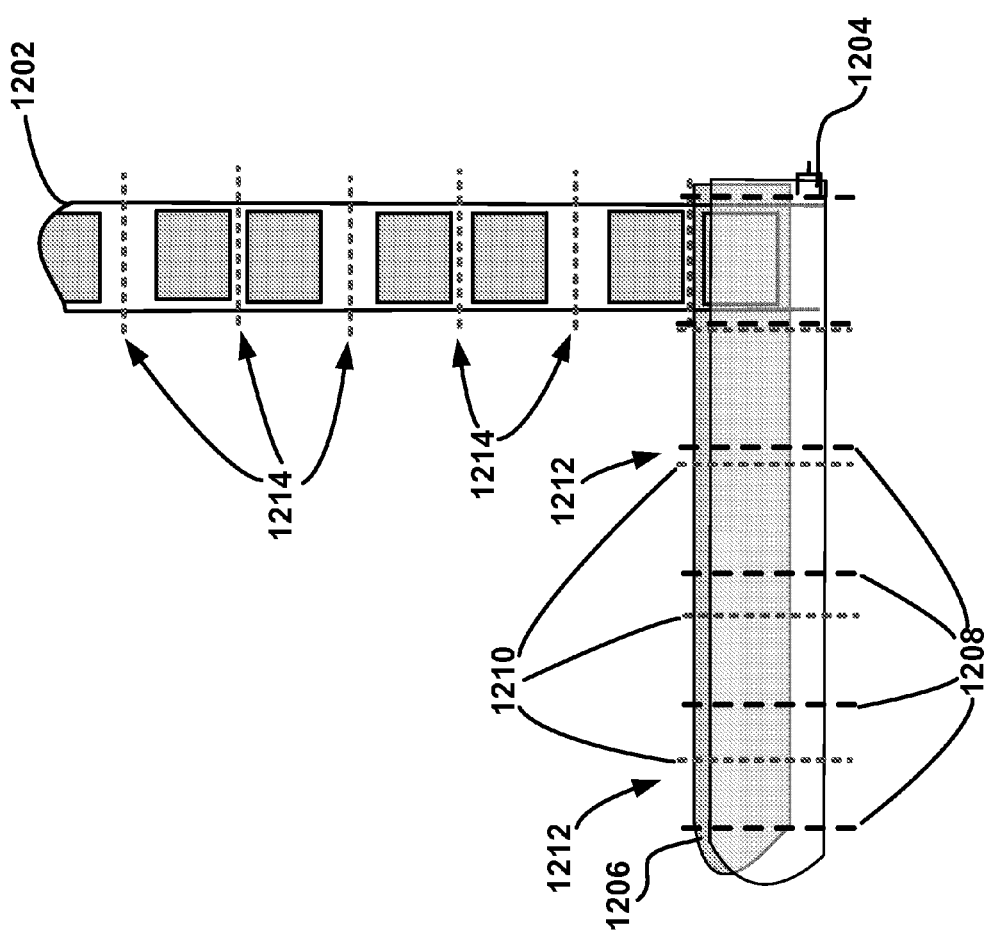
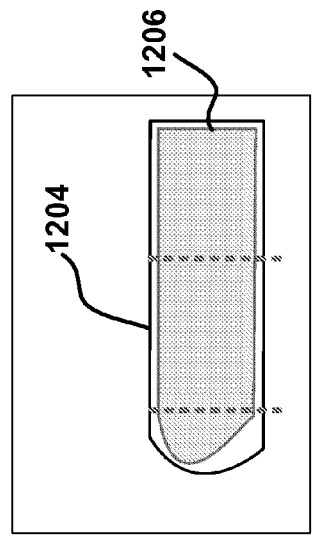
Fig 14(a)
Fig 14(b)

ELECTROCHEMICAL CELL HAVING A FOLDED ELECTRODE AND SEPARATOR, BATTERY INCLUDING THE SAME, AND METHOD OF FORMING SAME

FIELD OF INVENTION

The present invention generally relates to electrochemical cells and batteries including the cells. More particularly, the invention relates to electrochemical cells including one or more folded electrodes and a folded separator, to batteries including the electrochemical cells, and to methods of forming the electrochemical cells and batteries.

BACKGROUND OF THE INVENTION

A typical battery includes one or more electrochemical cells to store electrical energy. Each electrochemical cell includes an anode (negatively charged electrode during discharge of the cell), a cathode (positively charged electrode during discharge of the cell), an electrolyte between the anode and the cathode, and also typically includes a separator between the anode and cathode to, among other things, keep the anode and cathode from contacting each other.

An amount of electrical charge an electrochemical cell can store is related to the electrochemical system, which is a combination of reactive and nonreactive materials, an amount of electrode material and/or electrolyte material available for an electrochemical reaction. Generally, the greater the amount of available electrode and/or electrolyte material, the greater the charge capacity. In addition, larger electrode surface area decreases the internal resistance of the battery and can improve diffusion processes, which enables discharging and charging the battery at relatively large currents and improves other charge and discharge properties of the cell. Techniques to provide electrochemical cells with additional electrode surface and thereby improve cell performance include winding layers of the cell into a cylindrical shape to form a wound cell and stacking multiple layers of cells on top of one another to form a stacked cell.

Wound electrochemical cells are typically formed by layering anode, separator, and cathode layers adjacent each other, e.g., from continuous rolls of the respective layers, and then winding the layers to form a cylindrical structure. The cylindrical structure can be flattened to form a flat pack structure, which may better conform to design configurations of devices that use the batteries including the cells. Because the wound cells can be formed from continuous rolls of materials, manufacturing wound electrochemical cells is a relatively inexpensive way to form electrochemical cells having relatively high charge capacity and other desired properties. However, wound electrochemical cells and batteries including the cells may experience an inhomogeneous distribution of pressure and force caused by a volume change of portions of the cell during charge and discharge of the cell; this is especially true when a wound cell is compressed into a flat pack. This change in pressure may reduce the performance of the battery, the safety of the battery, and/or the lifetime of the battery.

Stacked cells are formed by placing multiple structures, each including an anode, separator, and cathode layer, in a vertical stack. Compared to would cells, stacked cells are relatively expensive to manufacture, because pre-cut or formed sheets of the anode, separator, and cathode layers must be separately formed and then stacked upon one another, which requires time-consuming, precise alignment of the layers. In addition, the equipment required to precisely place each layer is relatively expensive. However, cells and batteries formed using this technique exhibit relatively homogeneous force distribution caused by any volume change of the cell during charge and discharge of the cell. Thus, such cells may exhibit increased performance, lifetime, and safety compared to similar cells formed using wound cell technology.

Another technique used to form electrochemical cells includes using a z-fold or accordion fold of one or more layers of the electrochemical cell. Using a z-fold technique may be advantageous compared to winding layers of a cell, because folding techniques may allow for more homogeneous pressure and force distribution within the cells; however, the equipment and time required for folding cell layers is generally greater than for winding the cell layers. Folding techniques may be advantageous over stacking methods, because at least some of the layers of cells can be derived from continuous or semi-continuous sheets of materials, whereas all layers of a stacked cell are pre-cut; however, the pressure distribution within a cell including folded layers may not be as uniform as within stacked cells.

U.S. Publication No. 2012/0208066 A1, published Aug. 16, 2012, in the name of Schaefer et al., discloses a z-fold technique used in forming an electrode stack of an electrochemical cell. The disclosed method includes a continuous layer of z-folded separator material and cathode and anode electrode plates that are interposed between z-folded layers of the separator material. Although the electrochemical cells disclosed in Schaefer et al. have some advantages over purely stacked electrochemical cells, the cells of Schaefer et al. still require precise formation and alignment of both anode and cathode plates of the cells.

PCT Publication No. WO 2009/078632 A2, published Jun. 25, 2009, in the name of LG CHEM., LTD., discloses a battery that includes a plurality of overlapping electrochemical cells, wherein each cell includes a cathode, an anode, and a separator, and a continuous separator sheet is disposed between the overlapping electrochemical cells. While the disclosed cells have the advantage of being surrounded by a continuous sheet of separator material, the cells still require precise formation and alignment of the cathode, separator, and anode plates on top of the continuous sheet of separator material.

JP Publication No. 09017441 A, published Jan. 17, 1997, in the name of Kazuhiro, discloses a square battery having a z-folded anode layer and a z-folded cathode layer, wherein the cathode layer is directly coated with a continuous coating of separator material. The battery also includes a current collector that extends vertically and horizontally to prevent the polar sheets from shifting. The current collector is purported to have an advantage of not requiring tabs on electrodes. However, the current collector disclosed in Kazuhiro adds considerable weight and volume to the battery. In addition, the coated cathode and cells including such cathodes are thought to be relatively difficult to manufacture.

Although z-fold or accordion fold techniques for various layers within an electrochemical have been developed, the techniques still include additional steps, alignment of multiple plates, relatively difficult manufacturing steps, and/or add additional volume and weight to the cell. Accordingly, improved electrochemical cells and batteries and methods of forming the cells and batteries are desired.

SUMMARY OF THE INVENTION

The present disclosure generally relates to electrochemical cells, batteries including the cells, and to methods of forming the cells and batteries. More particularly, various embodiments of the disclosure relate to electrochemical cells including a first electrode (e.g., an anode or a cathode), a second electrode (e.g., a cathode or an anode), and a separator between the first electrode and the second electrode, wherein two or more of the first electrode, second electrode, and separator include a z-fold or accordion fold. For example, exemplary cells in accordance with various embodiments include a z-folded first electrode (anode or cathode) that is folded in a first direction and a z-folded separator that is z-folded in a second direction, which is orthogonal to the first direction. Additionally or alternatively, exemplary cells include a first electrode that is z-folded along a first direction and a combination of a second electrode and a separator that is z-folded in a second direction, which is orthogonal to the first direction. As set forth in more detail below, the electrochemical cells of the present disclosure provide advantages over the prior art, including relative ease and low cost of manufacture, high energy density, and safety.

In accordance with various embodiments of the disclosure, an electrochemical cell includes a first electrode layer, a separator layer overlaying the first electrode layer, the separator layer folded back upon itself in a first direction to form a first separator section, a second separator section and an opening there between, and a second electrode comprising a plate, wherein the plate is between the first separator section and the second separator section. The first electrode layer is folded over the separator layer in a second direction, which is orthogonal to the first direction, to form a first first electrode section underlying the first separator section and a second first electrode section overlying the second separator section. In accordance with various aspects of these embodiments, an electrochemical cell includes a plurality (e.g., greater than two) of first electrode sections, separator sections, and plates, such that the first electrode layer and the separator layer each form z-folded layers. In accordance with further aspects of these embodiments, the first electrode layer includes active cathode material, which may be patch coated onto a substrate. In accordance with alternative aspects, the first electrode layer comprises active anode material. In accordance with yet additional aspects, the folded separator layer overlaps the plate(s) in areas where the plate(s) are overlapped by the folded first electrode layer to prevent shorting between the first electrode layer and the second electrode plates. The use of the folded layers allows for the relatively easy and inexpensive manufacture of cells with starting materials in the form of, for example, a continuous or semi-continuous roll, tape, or web of first electrode layer material and separator layer material, and the use of second electrode plate(s) allows for the formation of a cell with relatively even pressure distribution.

In accordance with additional embodiments of the disclosure, a method of forming an electrochemical cell includes the steps of placing a separator layer overlying a first electrode layer, in a direction orthogonal to the first electrode layer, folding the separator layer back onto itself to form a first separator section, a second separator section, and a first opening there between, folding the first electrode layer over the second separator section to form a first first electrode section underlying the first separator section and a second first electrode section overlying the second separator section, and placing a first sheet of second electrode material within the opening. These steps may be repeated for a desired number of first electrode, second electrode, and separator sections to obtain desired electrochemical cell or battery properties. In accordance with exemplary aspects of these embodiments, the step of placing a first sheet occurs prior to the step of folding the first electrode layer over the second separator section. In accordance with alternative aspects, the step of placing the first sheet occurs after the step of folding first electrode layer over the second separator section. In accordance with yet further aspects, the method further includes the step of providing a separator section underlying the first section of a first electrode layer or at the bottom of the electrochemical cell. And, in accordance with yet further aspects, the method further includes providing a separator section overlying a top section of first electrode material or at the top of the electrochemical cell. In accordance with additional aspects, the method further includes the step of forming contact to a first electrode layer via a folded section of the first electrode layer. In accordance with additional aspects, the method includes the step of forming contact to a second electrode using a contact area or region on a second electrode plate that is not covered with active electrode material. And, in accordance with additional aspects of these embodiments, the method includes the steps of cutting a folded section of the first electrode layer to form an edge section and forming contact to a first electrode at or near the edge section.

In accordance with further embodiments of the disclosure, an electrochemical cell includes a first electrode layer including a first first electrode section, a second electrode layer overlying the first electrode layer, the second electrode layer comprising a first surface and a second surface comprising active material, and a separator layer partially overlying the second surface, wherein a combination of the second electrode layer and the separator layer is folded back over itself in a first direction, and the first electrode layer is folded over the combination in a second direction to form a second first electrode section, and wherein the first direction and the second direction are orthogonal each other. In accordance with various aspects of these embodiments, an electrochemical cell includes a plurality of first electrode sections and combination sections, such that the first electrode layer and the combination of the second electrode layer and the separator layer both form z-folded layers. In accordance with further aspects of these embodiments, the first electrode layer includes active cathode material. In accordance with alternative aspects, the first electrode layer comprises active anode material. In accordance with further aspects, the separator layer and the second electrode layer are folded in offset positions to form contact areas or regions of the second electrode layer that are not covered by the separator layer. In accordance with yet additional aspects, the folded separator layer of the combination overlaps the second electrode layer in areas where the second electrode is overlapped by the first electrode layer to prevent shorting between the first and the second electrode layers. In accordance with further aspects, the first and/or second surface is partially coated with active material. In accordance with yet additional aspects, the second electrode layer comprises one or more contact areas or regions. In accordance with yet additional aspects, the first electrode layer comprises active material on a top surface and a bottom surface of the layer. In accordance with yet further aspects, the electrochemical cell includes a section of the separator layer on the bottom of the electrochemical cell and/or the top of the electrochemical cell.

In accordance with yet further embodiments of the disclosure, a method of forming an electrochemical cell includes the steps of placing a combination of a second electrode layer and a separator layer overlying a first electrode section of a first electrode layer, the direction of the combination in a direction orthogonal to the first electrode layer, folding the combination back onto itself to form a first combination section and a second combination section, and folding first electrode layer over the second combination section to form a second first electrode section overlying the second section of the combination. In accordance with exemplary aspects of these embodiments, the method includes the steps of forming additional first electrode and combination sections to obtain desired electrochemical cell and battery properties. In accordance with yet additional aspects, the method further includes the step of providing separator material on a bottom of the electrochemical cell and/or a top of the electrochemical cell. In accordance with yet further aspects, the method includes a step of providing a second electrode layer including a substrate and intermittent sections of active material overlying the substrate. In accordance with yet additional aspects, the method further includes a step of providing a second electrode layer comprising a substrate and intermittent sections of active material overlying the substrate, wherein the substrate includes one or more contact areas or regions, and the contact areas or regions are at least partially not coated with active material. In accordance with yet further aspects, the method includes a step of forming contact to a first electrode through a folded section of the first electrode layer. In accordance with alternative aspects, the method includes the steps of cutting a folded section of the first electrode layer to form an edge section and forming contact to a first electrode at or near the edge section. In accordance with yet additional aspects of these embodiments, the method further includes the step of forming contact areas or regions to the second electrode to provide an opportunity of using a tab, current collector or bus bar or other contacting parts.

In accordance with additional embodiments of the disclosure, an electrochemical cell includes a first electrode layer, a second electrode layer overlying the first electrode layer, the second electrode layer comprising a first surface comprising active material and a second surface comprising active material, a first separator layer partially overlying the first surface, and a second separator layer partially overlying the second surface, wherein a combination of the first separator layer, the second electrode layer, and the second separator layer overlays a first section of the of the first electrode layer, and wherein the first electrode layer is orthogonally folded over the combination to form a second section of the first electrode layer. An electrochemical cell may contain any number of first electrode sections and combination sections to obtain desired electrochemical cell or battery properties. In accordance with various aspects of these embodiments, the first electrode layer comprises active cathode material and the second electrode layer comprises active anode material. In accordance with alternative aspects, the first electrode layer comprises active anode material and the second electrode layer comprises active cathode material. The first electrode layer may include a top and/or bottom surface that is partially coated with active material. Exemplary cells may include separator material on the bottom and/or top of the electrochemical cell. In accordance with further exemplary aspects, the second electrode layer comprises one or more contact areas or regions that may be used for tabbing or contacting, wherein the contact areas or regions are at least partially not covered with active electrode material.

In accordance with yet additional embodiments of the disclosure, a method of forming an electrochemical cell includes the steps of placing a combination of a first separator layer, a second electrode layer, and a second separator layer overlying a section of a first electrode layer, in a direction orthogonal to the first electrode layer and folding the first electrode layer over the combination in a direction orthogonal to the combination. These steps may be repeated until a desired number of first electrode sections and combination sections are created. In accordance with further aspects, the method further includes the step of providing a separator section at a bottom of the electrochemical cell and/or providing a separator section material at a top of the electrochemical cell. In accordance with yet further aspects, the method includes a step of forming contact area or region to a first electrode through a folded section of the first electrode layer. In accordance with alternative aspects, the method includes the steps of cutting a folded section of the first electrode layer to form an edge section and forming contact to a first electrode layer at or near the edge section. In accordance with yet additional aspects of these embodiments, the method further includes the step of forming contact to the second electrode using, e.g., a contact area or region suitable for tabbing.

In accordance with further embodiments of the disclosure, a battery includes one or more electrochemical cells as disclosed herein. The battery may additionally include a casing and terminals.

And, in accordance with yet further embodiments, a method of forming a battery includes a method of forming an electrochemical cell as described herein. The method may further include the steps of providing terminals to one or more electrochemical cells and encasing the one or more electrochemical cells.

BRIEF DESCRIPTION OF THE DRAWING FIGURES

The exemplary embodiments of the present invention will be described in connection with the appended drawing figures, in which.

FIGS. 14(a) and (b) illustrate exemplary first electrode, second electrode, and separator layers prior to folding the layers in accordance with additional exemplary embodiments of the disclosure.

Figure 15:
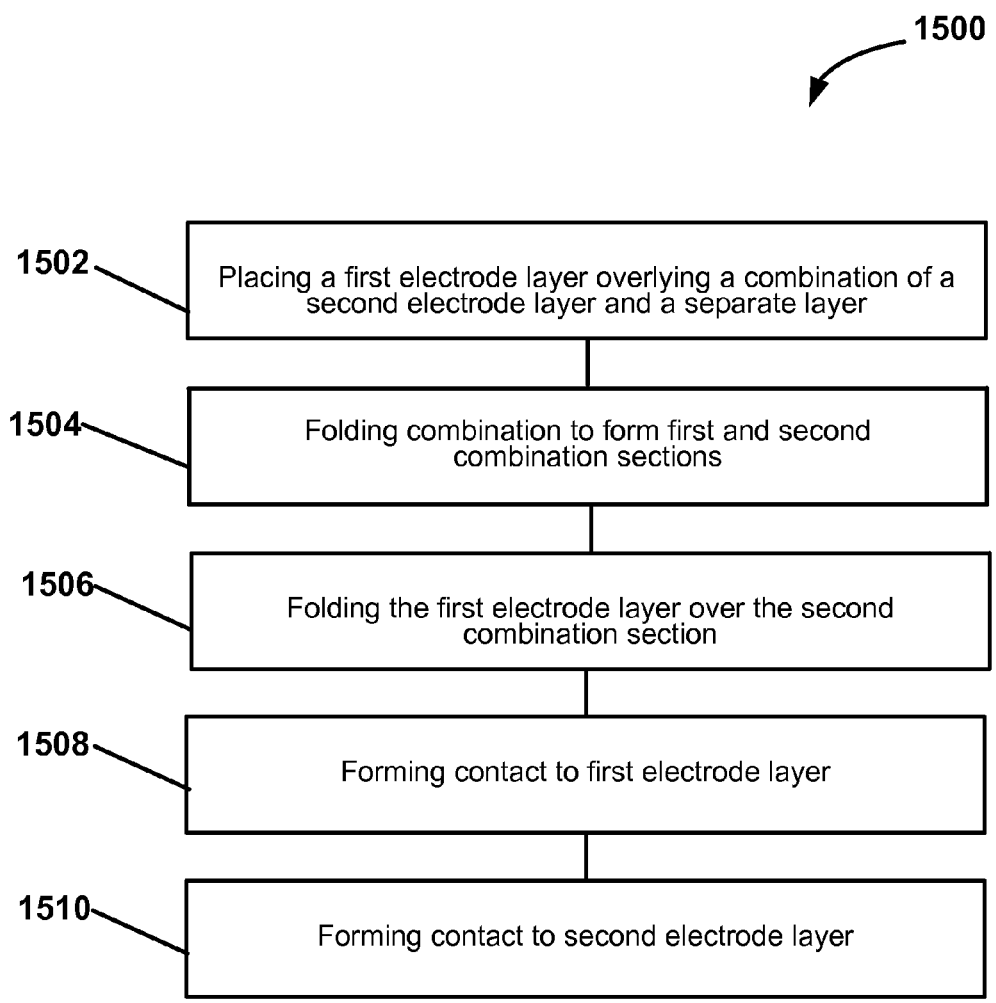

FIG. 15 illustrates another method of forming an electrochemical cell in accordance with exemplary embodiments of the disclosure.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS OF THE INVENTION

The description of exemplary embodiments of the present invention provided below is merely exemplary and is intended for purposes of illustration only; the following description is not intended to limit the scope of the invention disclosed herein.

As set forth in more detail below, exemplary electrochemical cells and batteries including the cells of the present disclosure are advantageous over electrochemical cells including wound or stacked cells. In addition, the electrochemical cells described herein are relatively easy to manufacture, have a relatively high energy density, and are safe, compared to other electrochemical cells having one or more z-folded layers. The electrochemical cells described below can be used with a variety of electrochemical cell technologies, including lithium ion cells, lithium polymer cells, nickel metal hydride cells, lithium sulfur cells, lithium air cells, lithium oxygen cells, and the like.

Figure 1:
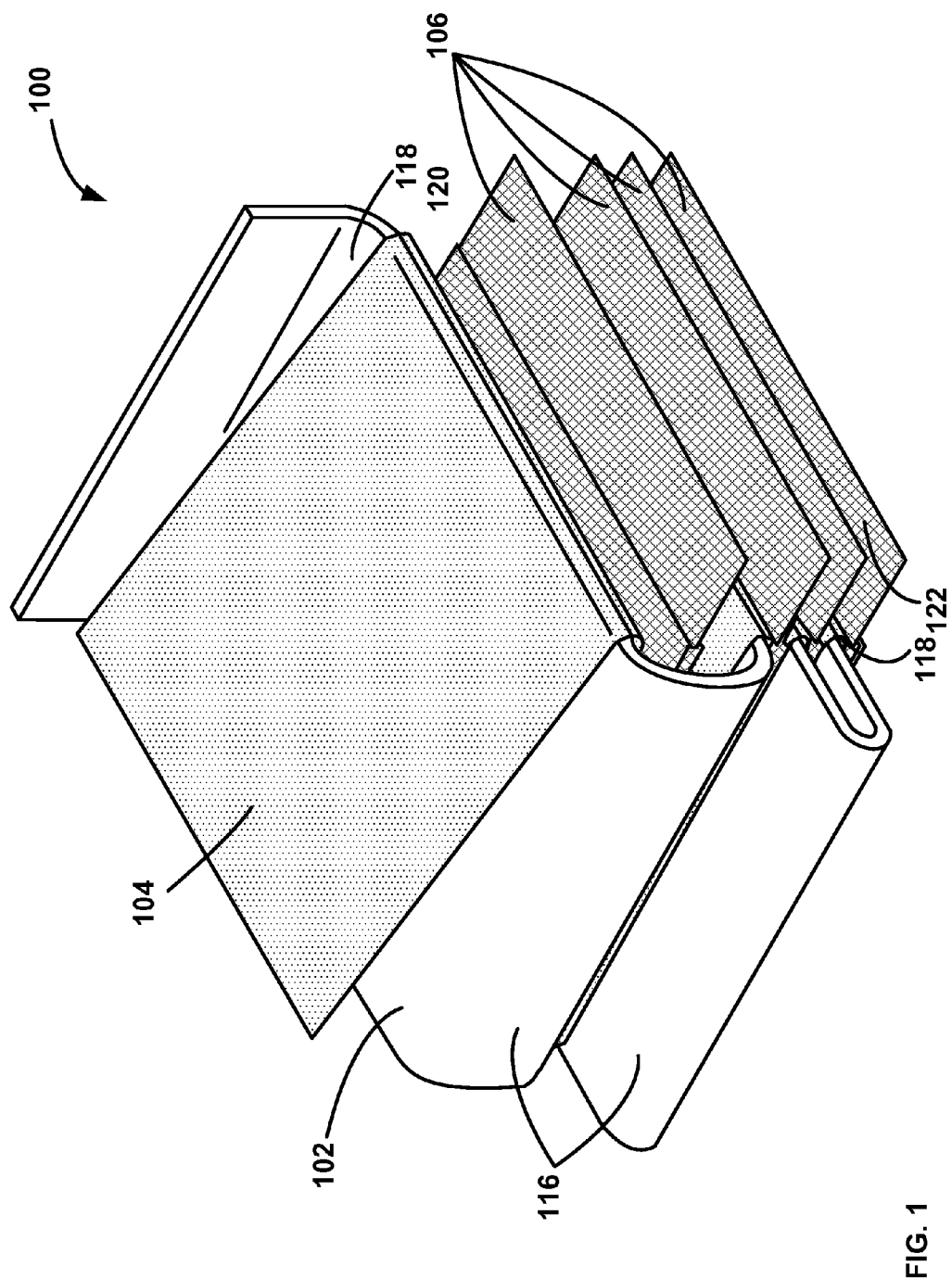
FIG. 1 illustrates a portion of an electrochemical cell in accordance with exemplary embodiments of the disclosure.
Figure 2:
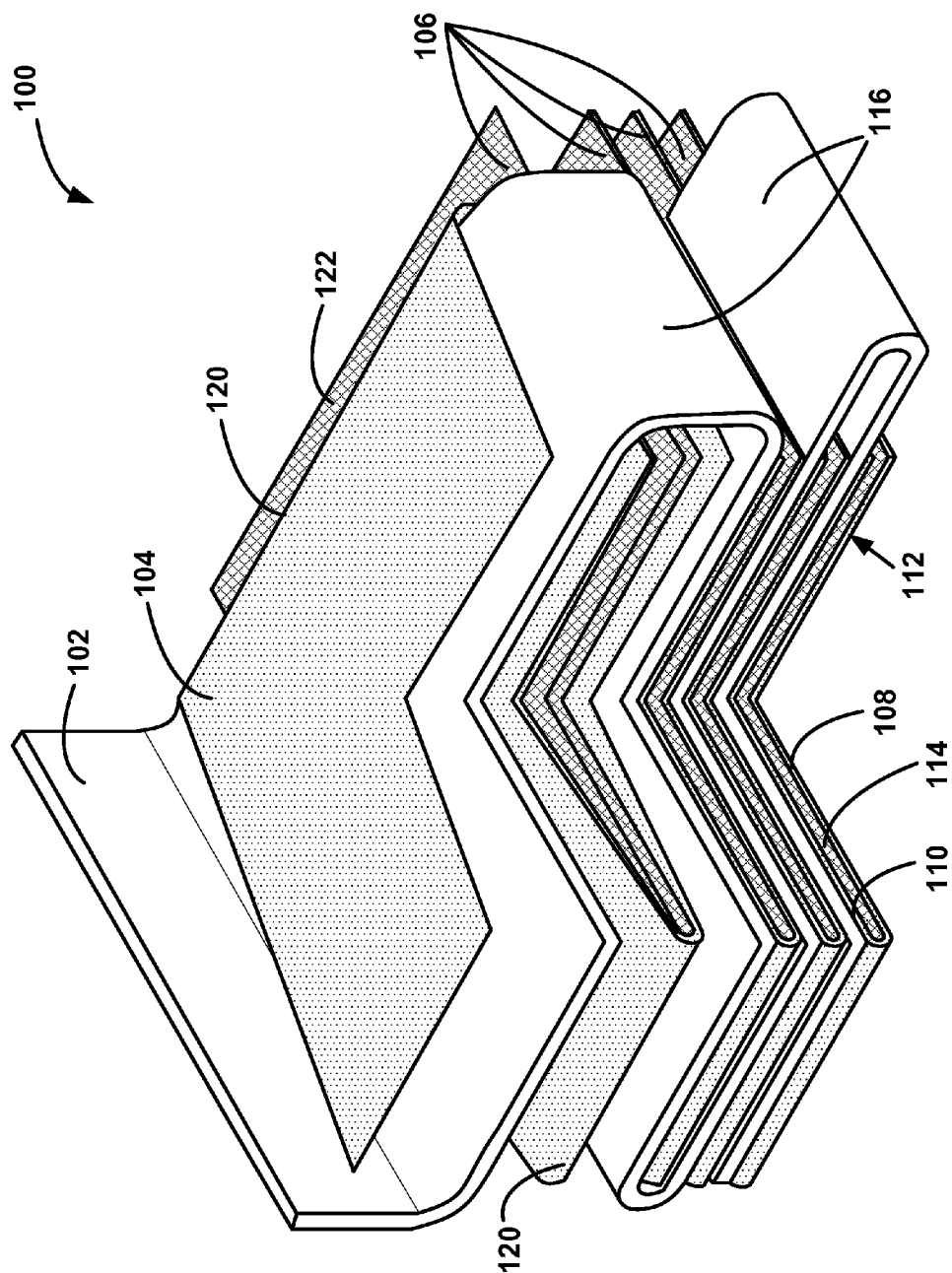
FIG. 2 illustrates a sectional view of the electrochemical cell portion illustrated in FIG. 1.

FIGS. 1 and 2 illustrate a portion of an electrochemical cell 100, including a first electrode layer 102, a separator layer 104, and second electrode plates 106, in accordance with exemplary embodiments of this disclosure. Although not illustrated, electrochemical cells may also include a suitable electrolyte and/or contacts to first electrode layer 102 and/or one or more second electrode plates 106. Further, the electrochemical cells described herein or portions thereof may include additional electrode and separator layers not illustrated in the figures.

First electrode layer 102 and separator layer 104 are orthogonally z-folded with respect to each other, such that first electrode layer 102 is orthogonal to separator layer 104 and folds 116 in first electrode layer 102 are orthogonal to folds 120 in separator layer 104. As used herein, the term orthogonal means ninety degrees or substantially ninety degrees, such that the first electrode and separator layers can be z-folded with respect to each other.

Electrochemical cell 100 is thought to exhibit less inhomogeneous pressure distribution resulting from charging and discharging of the cell, compared to similar flat pack electrochemical cells formed from wound cells, and is therefore thought to be safer than such cells. Additionally, cell 100 is relatively easy and less expensive to manufacture compared to stacked cells, because only one electrode is provided in plate form. Further, as set forth in more detail below, plate 106 is placed within an opening formed in folded separator layer 104, and thus alignment of plate 106 is relatively easy, compared to traditional pick-and-place techniques used to form stacked or similar cells.

Referring again to FIGS. 1 and 2, electrochemical cell 100 includes a first separator section 108 and a second separator section 110 overlying a first first electrode section 114. Sections 108 and 110 are formed by folding separator layer 104 back over itself, thereby forming an opening 112 between sections 108, 110. Second electrode plate 106 is placed within opening 112. The folded edge of separator layer 104 can serve as an edge guide or stop for plate 106. Separator layer 104 may overlap (e.g., extend beyond a width of) portions of plate 106 that overlap first electrode layer 102 to prevent shorting between layer 102 and plate 106 and thereby improve the performance and safety of cell 100 and batteries including the cell. Cell 100 may include any desired number of first electrode sections, separator sections, and second electrode plates; the illustrated cell includes four first electrode sections, nine separator sections, and four second electrode plates.

Contact to first electrode layer 102 may be formed at or near regions 116. To facilitate contact formation, regions 116 may extend outward from separator layer 104 and plates 106. The extension may be on one (as illustrated) or two sides of cell 100.

Contact to plate 106 may be formed at or near an edge of plate 106. For example, contact may be formed to plate 106 at contact areas or regions 122.

In accordance with exemplary aspects of these embodiments, first electrode layer 102 includes active anode material and second electrode plate 106 includes active cathode material. Alternatively, first electrode layer 102 includes active cathode material and second electrode plate includes active anode material. Exemplary suitable active cathode materials include electroactive transition metal chalcogenides, electroactive conductive polymers, and electroactive sulfur-containing materials, and combinations thereof. Suitable active anode materials include lithium metal, such as lithium foil and lithium deposited onto a substrate, such as a plastic film, and lithium alloys, such as lithium-aluminum alloys and lithium-tin alloys. The respective active materials may also include binders, fillers, and conductive material. By way of example, cathode active material may include electroactive sulfur material and the anode may include lithium.

First electrode layer 102 may include a continuous or discontinuous film of active electrode material on both a top and a bottom surface of a substrate, such as a carrier foil, or be a solid film or foil of active material. Alternatively, layer 102 may include a laminate structure or composite, such as a structure disclosed in U.S. Pat. No. 7,771,870 to Affinito et al., issued Aug. 10, 2010, entitled "Electrode Protection in Both Aqueous and Non-Aqueous Electrochemical Cells, Including Rechargeable Lithium Batteries" and U.S. Pat. No. 8,197,971 to Skotheim et al., issued Jun. 12, 2012, entitled "Lithium Anodes for Electrochemical Cells," the contents of which are hereby incorporated herein by reference, to the extent such contents do not conflict with the present disclosure. In the case of discontinuous films, the active electrode material may be omitted in folded regions 116.

Similarly, plate 106 may have a continuous or discontinuous layer of active electrode material on two surfaces of a substrate, such as a current collector, or be a solid sheet of material. In accordance with exemplary aspects, plate 106 includes a substrate (e.g., a current collector) with active electrode material coated onto the substrate. To facilitate contact formation to plate 106 and to mitigate chances of shorting between first electrode layer 102 and second electrode plate 106, plate 106 may include contact areas or regions 122, which extend beyond the overlap of first electrode layer 102 with second electrode plate 106, and which are at least partially not coated with active electrode material.

Separator layer 104 may be formed of any material suitable for use as an electrochemical cell separator. For example, layer 104 may include solid non-conductive or insulative materials that separate or insulate the anode and the cathode from each other. The separator may include pores, which may be partially or substantially filled with electrolyte. Further, separator layer may include a region 118 that partially covers area 122.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use with cells described herein are those comprising a microporous xerogel layer, for example, a microporous pseudo-boehmite layer, which may be provided either as a free-standing film or by a direct coating application on one of the electrodes. Solid electrolytes may also function as a separator in addition to their electrolyte function of permitting the transport of ions between the anode and the cathode.

Figure 3:
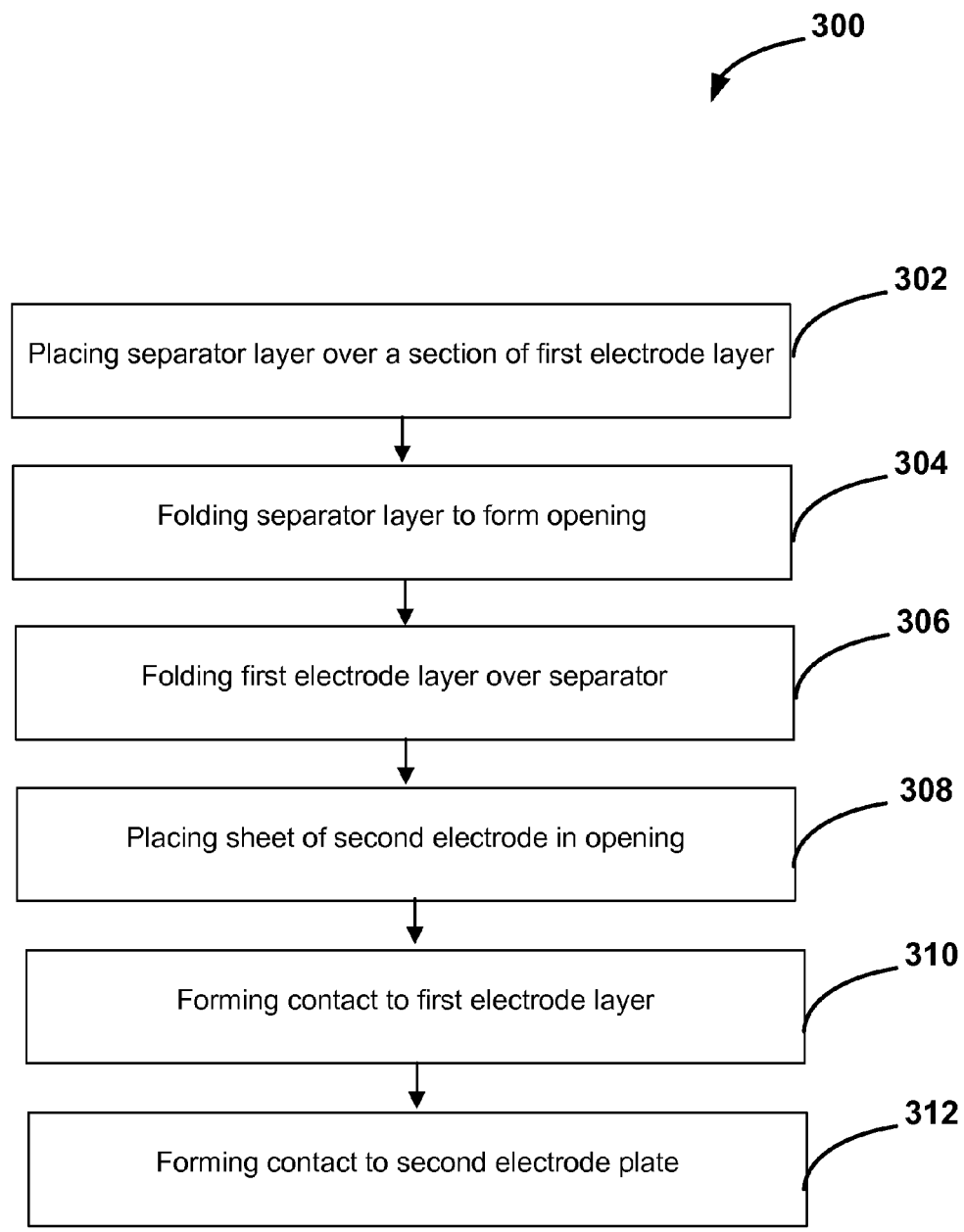
FIG. 3 illustrates a method of forming an electrochemical cell in accordance with exemplary embodiments of the disclosure.

FIG. 3 illustrates an exemplary method 300 of forming cell 100. Method 300 includes the steps of placing a separator layer over a section of a first electrode layer (step 302), folding the separator layer to form an opening (step 304), folding the first electrode over the separator layer (step 306), and placing a sheet of second electrode material into the opening (step 308). Although illustrated as starting with first electrode material, exemplary methods may begin with a folded separator layer or with a section of separator material, such that a separator section is at the bottom of a cell. Similarly, method 300 may include forming a separator section at a top of an electrochemical cell.

Step 302 includes placing a separator layer in a direction that is orthogonal to a first electrode layer. Both the separator layer and first electrode layer may be obtained from a continuous or semi-continuous supply, such as a tape, roll, or web of the respective materials.

During step 304, the separator layer is folded to form two separator segments, having an opening between the segments. The separator layer may be folded using, for example, moving rolls, knives, or other devices. The drive and movement mechanism can be performed using, for example, cam-control and/or with linear mechanical, electrical, or magnetic drives.

During step 306, the first electrode layer is folded over a top separator segment to form another section of the first electrode layer. The first electrode layer can be folded and moved using the same techniques described above in connection with the separator layer.

During step 308, a second electrode plate is placed within the opening formed between the two segments of the separator layer. Step 308 may be performed before or after step 306.

Steps 302-308 may be repeated until a desired number of first electrode sections, separator sections, and second electrode plates are formed. The cell may then be flattened to decrease the volume of the cell and to produce flattened regions (e.g., regions 116 and 120).

As noted above, method 300 may additionally include steps of providing separator material at the bottom and/or at the top of the electrochemical cell. Providing a cell with separator material at the top and/or bottom may provide addition isolation for the cell from other cells and/or battery components.

Method 300 may also optionally include a step of forming a contact to the first electrode layer (step 310) and/or a step of forming a contact to a second electrode plate (step 312). During step 310, contact to a first electrode layer 102 may be formed at folded region 116 of first electrode layer 102 by, for example, using a penetrating device to create a hole through the layer and then forming a conductive contact through the hole. This technique may be particularly useful when the first electrode layer includes a composite or laminate including non-conductive material. Alternatively, the first electrode layer may be cut at the folded regions to form edges and contact to the first electrode layer can be formed at or near the edges. Alternatively, contact may be made directly to the layer if the layer is conductive. Contact to the second electrode plate may be formed by, for example, welding, adhesives, and/or mechanical penetration techniques on a contact area or region of a second electrode material plate.

Figure 4:
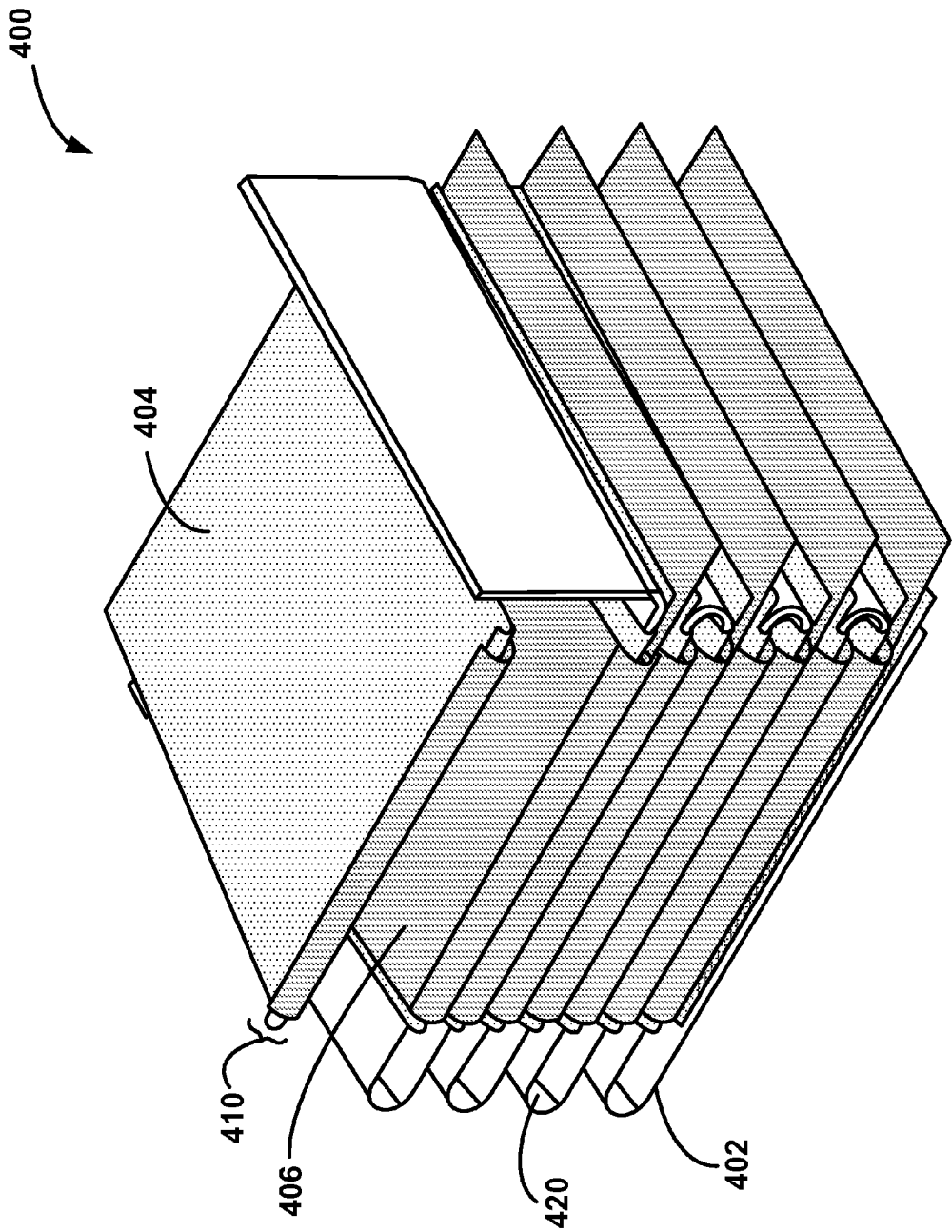
FIG. 4 illustrates a portion of an electrochemical cell in accordance with additional exemplary embodiments of the disclosure.
Figure 5:
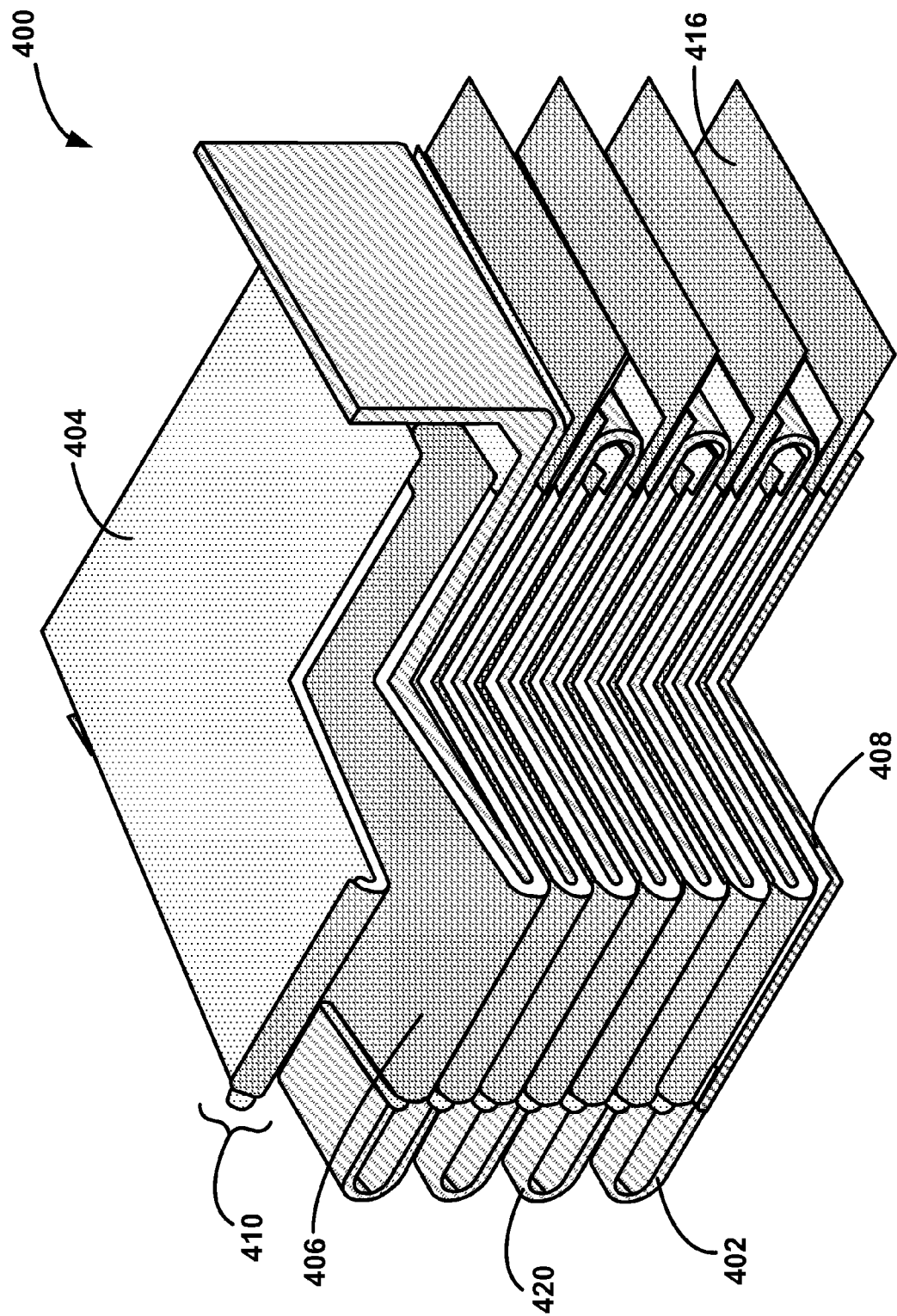
FIG. 5 illustrates a sectional view of the electrochemical cell portion illustrated in FIG. 4.
Figure 6:
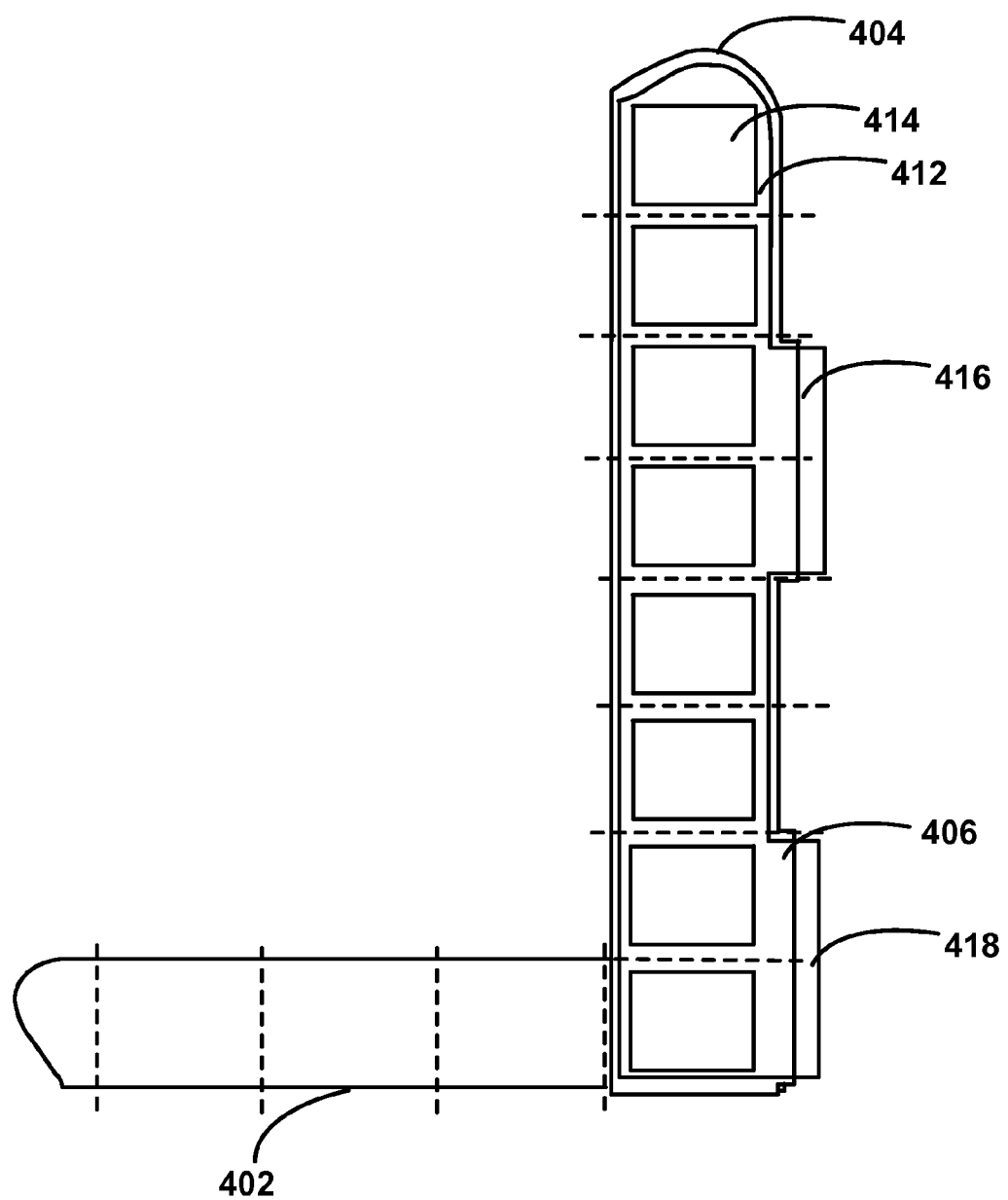
FIG. 6 illustrates exemplary first electrode, second electrode, and separator layers prior to folding the layers in accordance with exemplary embodiments of the disclosure.

FIGS. 4 and 5 illustrate a portion of another electrochemical cell 400 in accordance with additional embodiments of the disclosure and FIG. 6 illustrates starting layers of cell 400. Electrochemical cell 400 includes a first electrode layer 402, a separator layer 404, and a second electrode layer 406. All of the layers are folded and may originate from continuous sources. Accordingly, cell 400 is relatively easy and inexpensive to manufacture. In addition, because all of the layers are folded, the cell is less likely to experience inhomogeneous pressure distribution within the cell, and therefore the cell is relatively safe, compared to similar flat packs.

First electrode layer 402 may include any of the materials described above in connection with layer 102. For example, layer 402 may include a substrate that is coated on two sides with electrode active material. Alternatively, layer 402 may include a solid sheet of electrode active material or a composite or laminate comprising electrode active material. Layer 402 may or may not include intermittent contact areas or regions (e.g., on a substrate, such as a carrier foil), as described below in connection with layer 406.

Similarly, separator layer 404 may include any of the materials described above in connections with separator layer 104. To prevent contact between first electrode layer 402 and second electrode layer 406, separator layer 404 may extend beyond a width of layer 406, except for a section of areas 416, as illustrated in FIG. 6. In accordance with some exemplary embodiments, layer 404 is coated directly onto layer 406. Alternatively, layer 406 material may be coated onto layer 404.

Second electrode layer 406 may include any of the materials described in connection with plate 106. However, rather than plate form, layer 406 is a continuous layer within cell 400. Layer 406 may be of solid material or may have electrode active material coated onto a substrate. For example, layer 406 may include a substrate 412 (e.g., a current collector) and be intermittently coated on one side with active material 414. Layer 406 may also include contact areas or regions 416, which may be at least partially not coated with active material, such that contact can be made to uncoated sections of areas 416. As illustrated best in FIG. 6, areas 416 may be formed from a portion of layer 406 that is broader in width compared to other portions of layer 406. In accordance with various exemplary embodiments, the overlapping footprint of the first and second electrode layers includes a larger negative electrode footprint relative to the positive electrode footprint.

In the illustrated example, cell 400 includes a first first electrode section 408 and a combination 410 of second electrode layer 406 and separator layer 404 overlying first first electrode section 408. Combination 410 is placed in an orthogonal direction relative to first electrode layer 402 and is folded back over itself, such that separator layer 404 of combination 410 is between the first electrode layer 402 and second electrode layer 406. The folding of combination 410 (e.g., along line 418) creates two adjacent second electrode sections, which adds additional volume to the cell. However, the cell configuration allows for continuous sources of first electrode, separator, and second electrode materials from, for example, a roll, tape, or web of the respective materials, which allows for relatively easy and inexpensive manufacture of cell 400, without requiring precise placement or cutting of individual sheets of electrode material.

Similar to cell 100, cell 400 may include contact to the first electrode layer and the second electrode layer. Contact to first electrode layer 402 and second electrode layer 406 may include any suitable form, including the contacts described above in connections with electrode layers 102 and 106.

Figure 7:
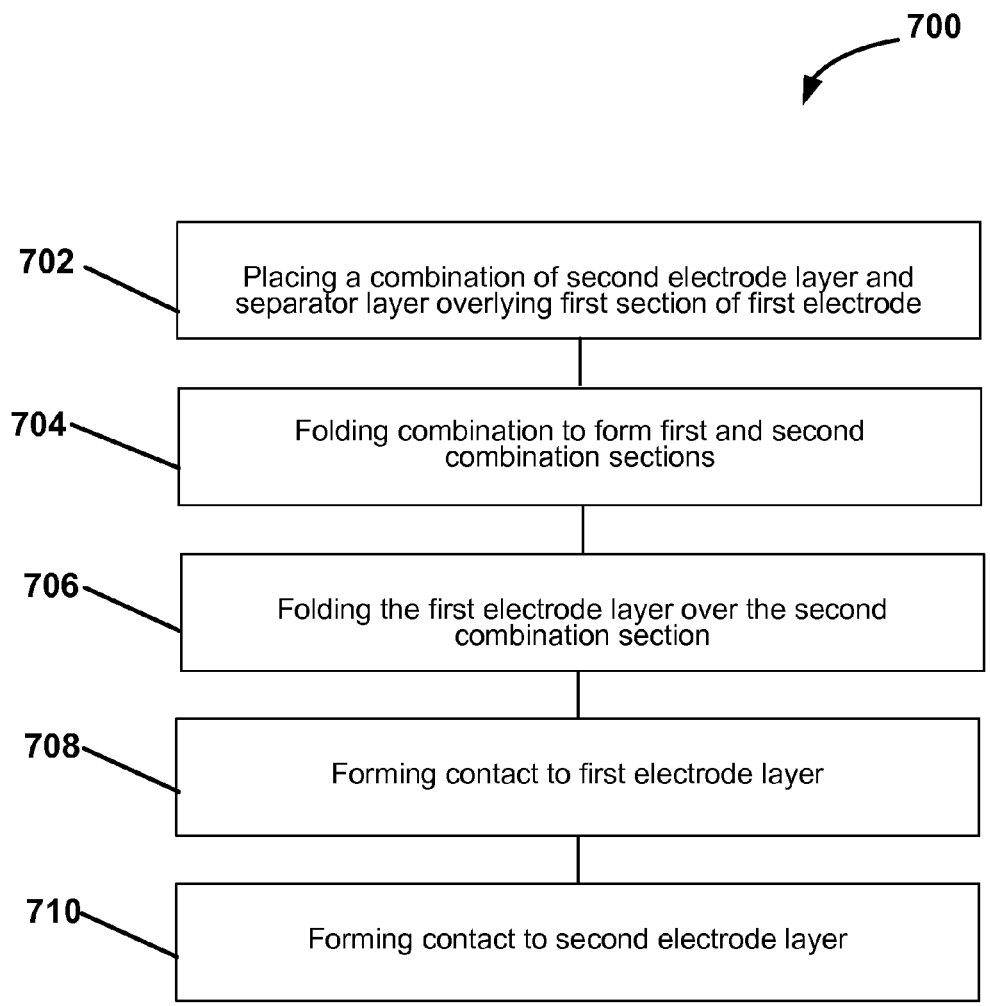
FIG. 7 illustrates another method of forming an electrochemical cell in accordance with exemplary embodiments of the disclosure.

FIG. 7 illustrates a method 700 of forming electrochemical cell 400 in accordance with additional embodiments of the disclosure. Method 700 includes the steps of placing a combination of a second electrode layer and a separator layer overlying a first first electrode section of a first electrode layer (step 702), folding the combination back onto itself to form a first combination section and a second combination section (step 704), and folding the first electrode layer over the second combination section to form a second first electrode section overlying the second combination section (step 706), and optionally includes the steps of forming contact to first electrode layer (step 708) and/or forming contact to second electrode layer (step 710). Although illustrated as starting with first electrode material, exemplary methods may alternatively begin with a separator layer or a separator section, such that a separator section is at the bottom of the cell. Similarly, method 700 may include forming a separator section at a top of the electrochemical cell.

Step 702 includes placing a combination of a second electrode layer and a separator layer overlying a first section of a first electrode layer in a direction that is orthogonal to the first electrode layer. The combination of the second electrode layer and the separator layer may be from a single source (e.g., a roll, tape, or web) or the second electrode layer and the separator layer may be from separate sources, in which case the separate layers come together prior to step 704.

During step 704, the combination of the separator layer and the second electrode layer is moved and folded (e.g., using any of the techniques described above in connection with steps 304 and 306) back onto itself, such that the separator layer is between the first electrode layer and the second electrode layer. As the combination is folded, a first combination section and a second combination section are formed.

Next, during step 706, the first electrode layer is moved and folded (e.g., using any of the techniques described above in connection with steps 304 and 306) back over the second section of the combination, in a direction orthogonal to the combination. As illustrated in FIGS. 4 and 5, the folding of the first electrode layer may form an extended region 420 to facilitate contact formation to the first electrode layer.

Steps 702-706 may be repeated until a desired number of first electrode sections, separator sections, and second electrode sections are formed. The cell may then be flattened to decrease the volume of the cell and to produce flattened regions (e.g., regions 420). Contacts to first and second electrode layers may then be formed during steps 708, 710 using the same or similar techniques as described above in connections with steps 310 and 312.

Figure 12:
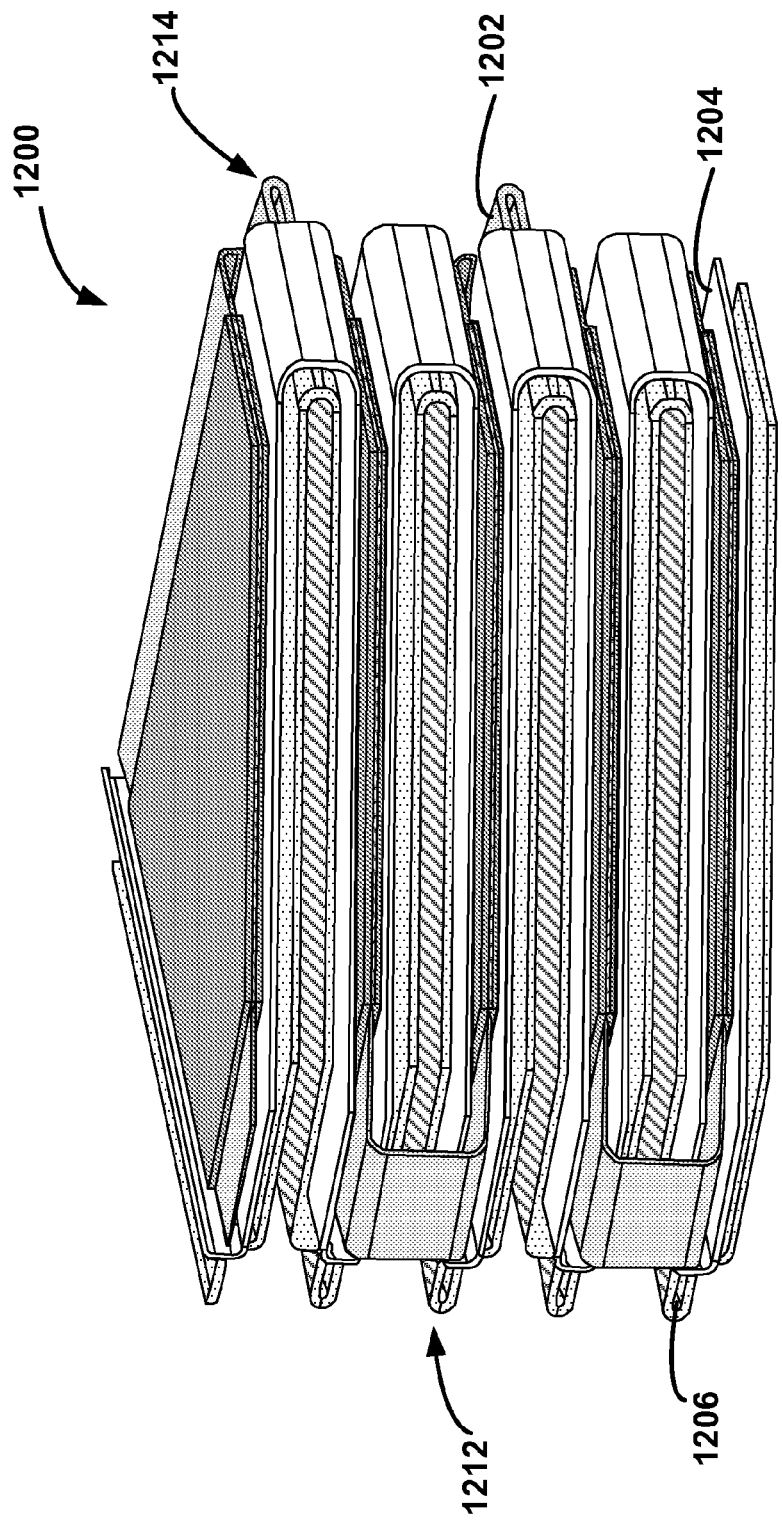
FIG. 12 illustrates a sectional view of a portion of an electrochemical cell in accordance with additional exemplary embodiments of the disclosure.
Figure 13:
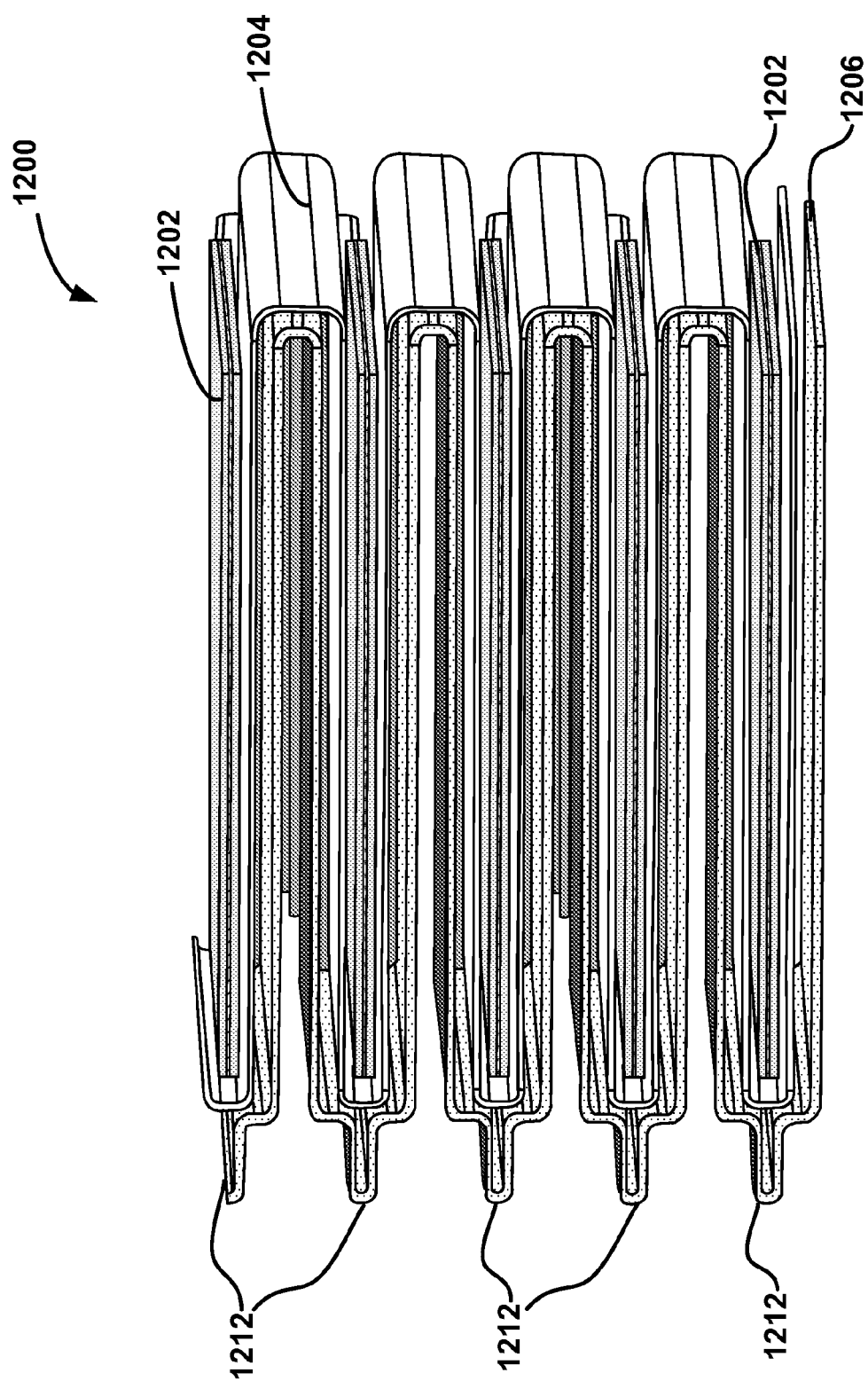
FIG. 13 illustrates another view of the electrochemical cell portion illustrated in FIG. 12.

FIGS. 12 and 13 illustrate a portion of another electrochemical cell 1200 in accordance with additional embodiments of the disclosure and FIGS. 14(*a*) and (*b*) illustrate starting layers that may be used to form cell 1200. Electrochemical cell 1200 is similar to cell 400; cell 1200 includes a first electrode layer 1202, a separator layer 1204, and a second electrode layer 1206, which may be formed of corresponding materials used to form layers 402-406.

Electrochemical cell 1200 may be formed in accordance with method 1500, illustrated in FIG. 15, which is similar to method 700, except method 1500 begins with placing a first electrode layer overlying a combination of a second electrode layer and a separator layer (step 1502), folding the combination back onto itself to form a first combination section and a second combination section (step 1504), and folding the first electrode layer over the second combination section to form a second first electrode section overlying the second combination section (step 1506), and optionally includes the steps of forming contact to first electrode layer (step 1508) and/or forming contact to second electrode layer (step 1510). Contact to first electrode layer may be formed in regions or areas 1214 and contact to second electrode layer may be formed in regions or areas 1212 using any of the techniques described herein.

In accordance with the illustrated example, separator layer 1204 and second electrode layer 1206 are folded in offset locations; separator layer 1204 may be folded at areas noted by lines 1208 and second electrode layer may be folded at areas indicated by lines 1210, such that contact areas or regions 1212 are formed, which do not include separator layer 1204 material. In FIG. 14(*a*), the separator layer is illustrated as offset from second electrode layer for illustration purposes only; separator layer may be directly overlying second electrode 206 and may overlap second electrode 206 to provide additional protection to the cell, as shown in FIG. 14(*b*). In this case, the separator layer may be introduced as a separate tape during method 1500. The remaining steps of method 1500 may be the same or similar to the corresponding steps of method 700. Not having separator layer material in contact regions or areas 1212 may be advantageous because the lack of separator material facilitates forming electrical contact to second electrode layer 1206, and it reduces a weight of cell 1200 and therefore increases an energy density of the cell. This technique may be particularly suitable for cells in which first electrode layer 1202 comprises cathode material and second electrode layer 1206 comprises anode material, which is covered by separator layer 1204, because the design provides a sufficient overlap of first electrode layer 1202 with separator layer 1204 and mitigates missing overlaps and/or overlap failures and therefore reduces otherwise required quality measures.

Figure 8:
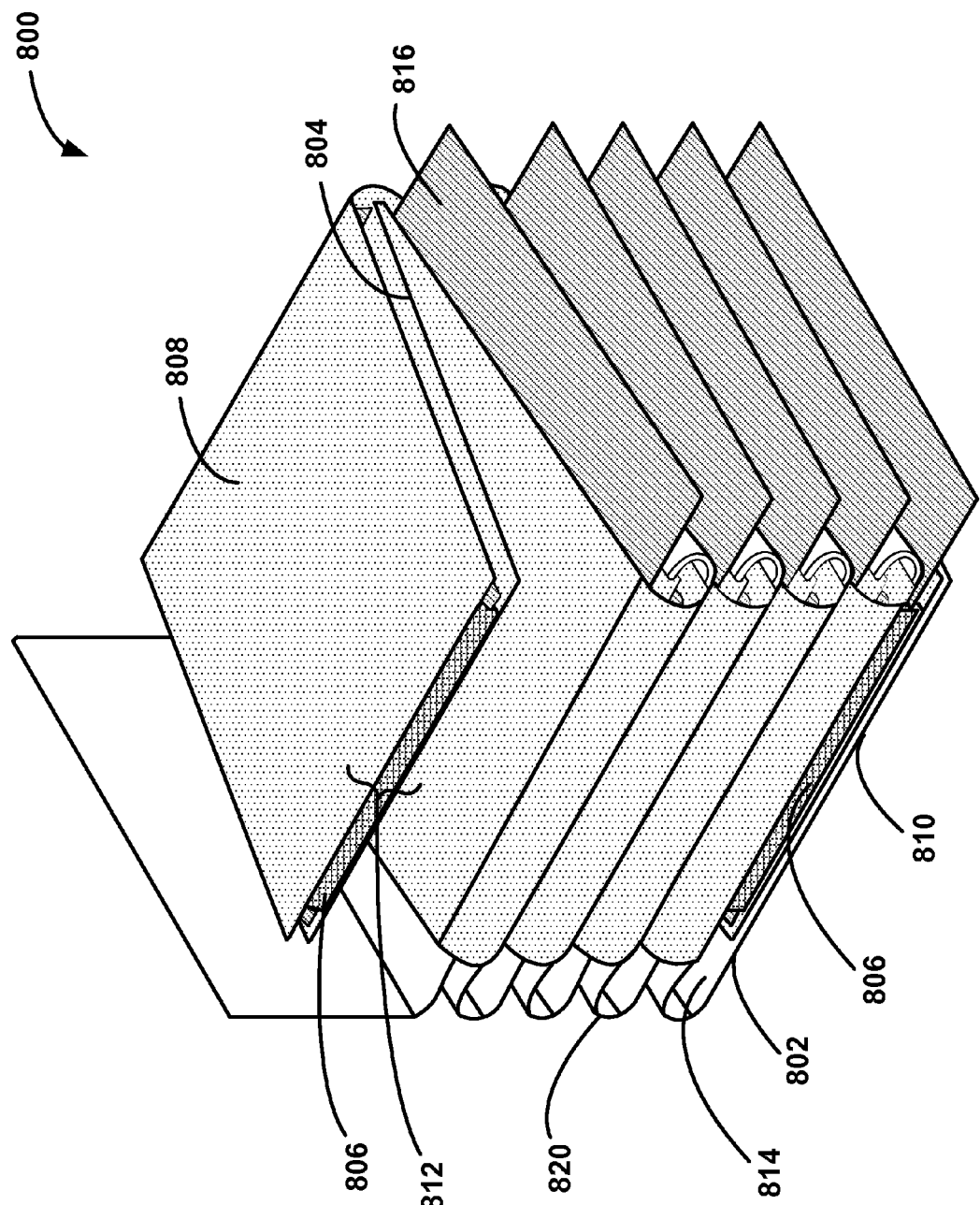
FIG. 8 illustrates a portion of an electrochemical cell in accordance with yet additional exemplary embodiments of the disclosure.
Figure 9:
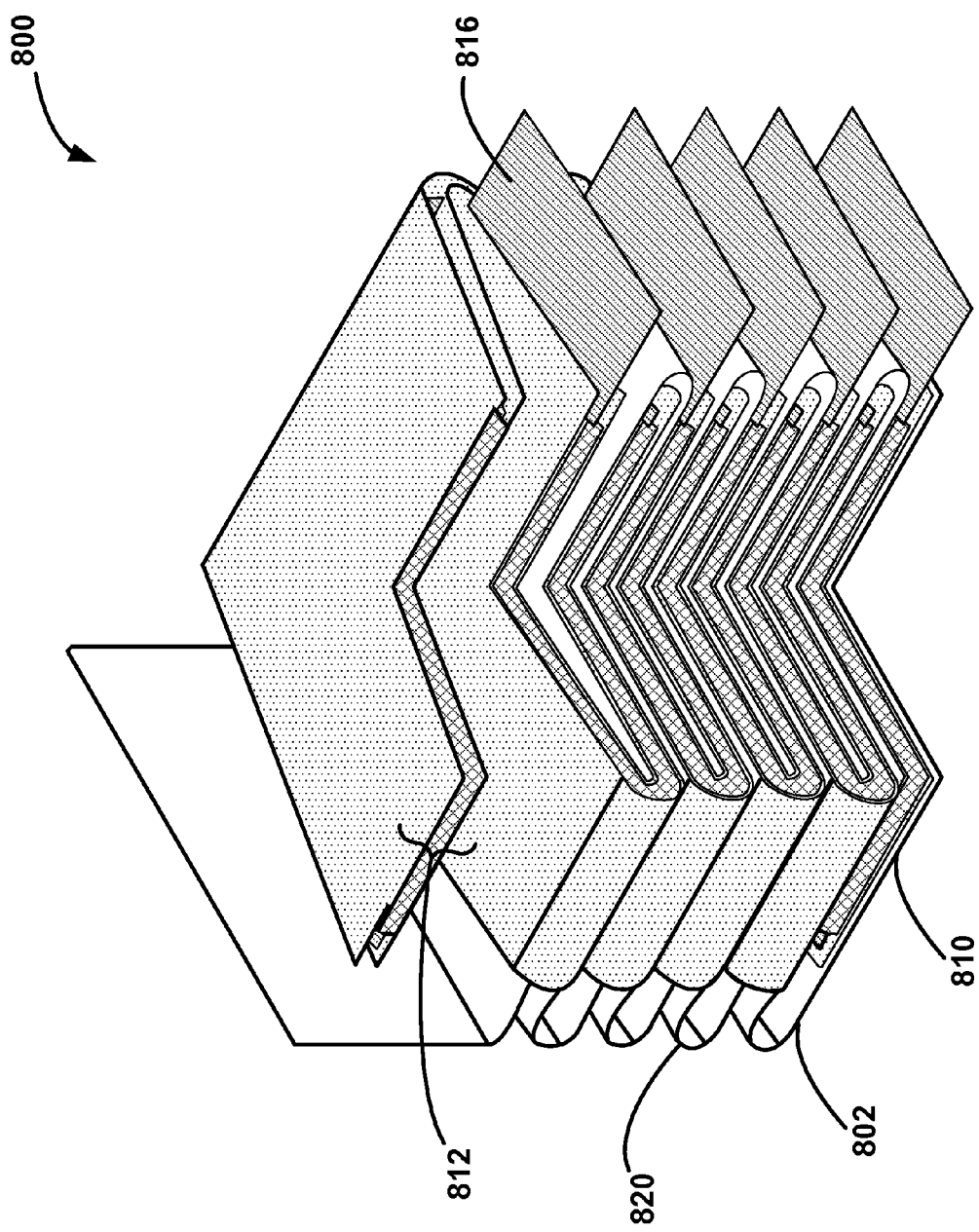
FIG. 9 illustrates a sectional view of the electrochemical cell portion illustrated in FIG. 8.
Figure 10:
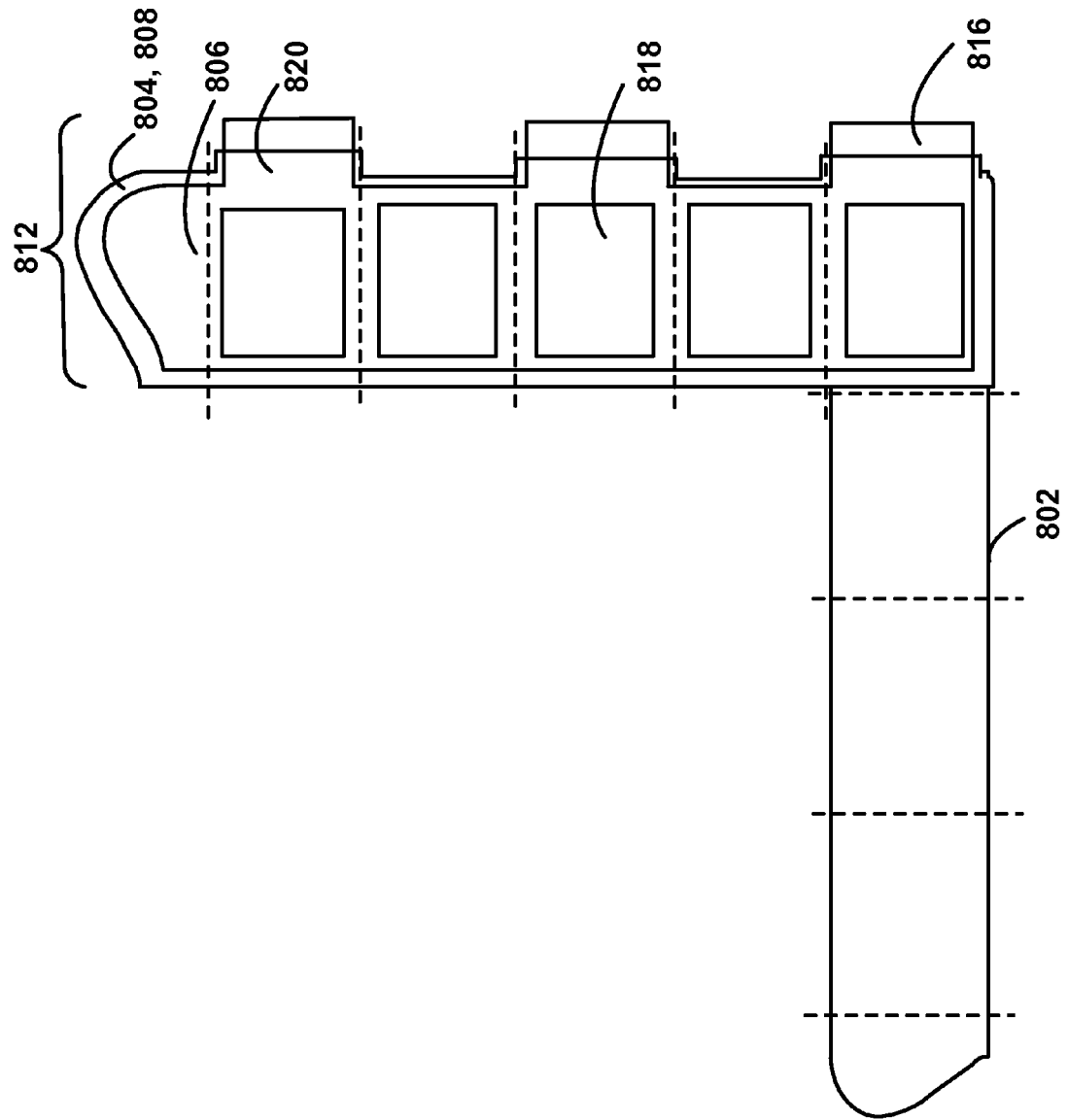
FIG. 10 illustrates additional exemplary first electrode, second electrode, and separator layers prior to folding the layers in accordance with exemplary embodiments.

FIGS. 8-10 illustrate a portion of another electrochemical cell 800 and components thereof in accordance with additional embodiments of the disclosure. Cell 800 is similar to cell 400, except cell 800 includes a combination of a second electrode layer and first and second separators layers. Including the additional separator layer in the structure allows electrochemical cells to be formed without folding the combination back over itself.

Electrochemical cell 800 includes a first electrode layer 802, a first separator layer 804, a second electrode layer 806, and a second separator layer 808. All of the layers are folded and may originate from continuous sources or semi-continuous sources. Accordingly, cell 800 is relatively easy and inexpensive to manufacture. In addition, because all of the layers are folded, the cell is less likely to experience inhomogeneous pressure distribution within the cell, compared to, for example, a flat pack, and therefore the cell is relatively safe, compared to similar flat packs. Further, the design allows covering of the electrodes with separator material to provide additional safety to the cells.

First electrode layer 802 may include any of the material described above in connection with layers 102 and 402. For example, layer 802 may include a substrate that is coated on two sides with electrode active material. Alternatively, layer 802 may include a solid sheet of electrode active material, or a composite or laminate comprising active electrode material. Layer 802 may or may not include intermittent contact areas or regions (e.g., on a carrier foil or substrate), as described above in connection with layer 406. Separator layers 804, 808 may include any of the materials described above in connections with separator layers 104 and 404 and may be separate layers or coated directly onto layer 406. Similarly, second electrode layer 806 may include any of the materials described in connection with layer 406, and may include a discontinuous coating of active materials 818 and contact areas or regions, as described above; however, because cell 800 includes two layers of separator material, layer 806, in accordance with exemplary cells, includes electrode active material 818 on two surfaces; e.g., regions of active material 818 on a substrate 820.

In the illustrated example, cell 800 includes a first first electrode section 810 and a combination 812 of first separator layer 804, second electrode layer 806, and second separator layer 808 overlying first first electrode section 810. Combination 812 is placed in an orthogonal direction relative to first electrode layer 802, such that first separator layer 804 of combination 812 is between first first electrode section 810 and the active material of a first surface of second electrode layer 806 and second separator layer 808 is between a second surface of second electrode layer and a second section of first electrode layer 814 that is formed by folding first electrode layer 802 over combination 812.

FIG. 10 illustrates first electrode layer 802 and combination 812 in greater detail. In the illustrated example, separator layers 804, 808 are wider and overlay second electrode layer 806, except over regions 816 of layer 806, which is only partially covered. The dashed lines in FIG. 10 indicate fold regions in the respective layers.

Cell 800 may include contacts to layer 802 and/or layer 806. The contacts may be the same or similar to the contacts described above in connection with cells 100 and 400.

Figure 11:
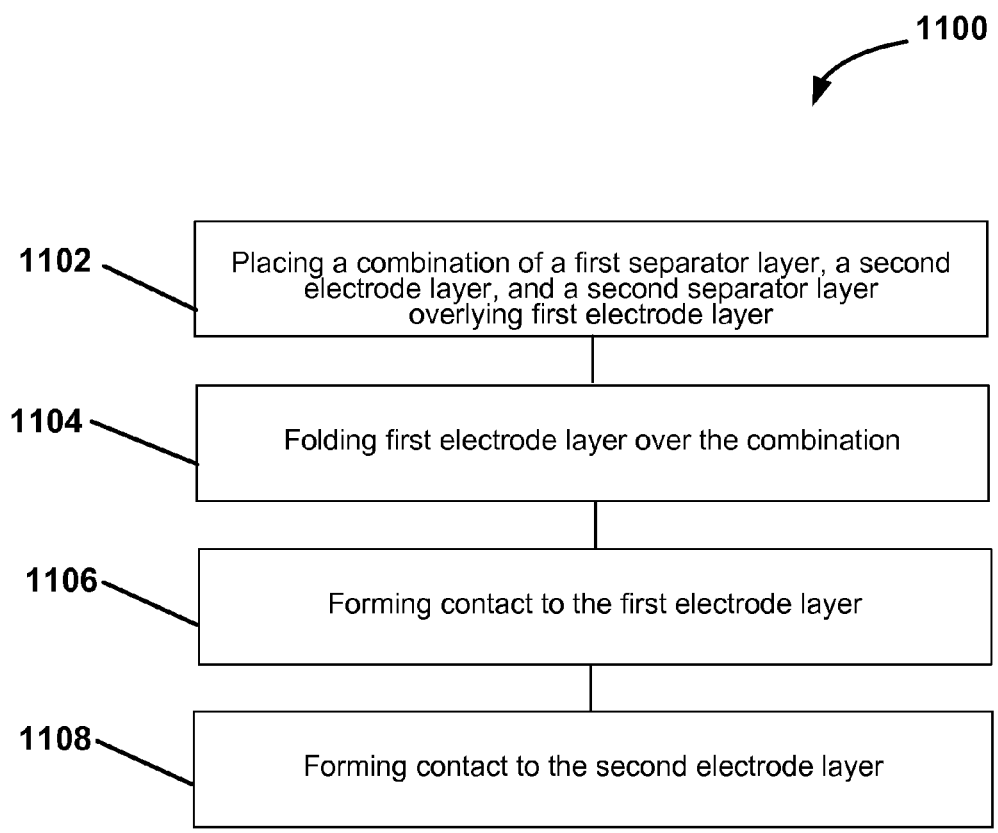
FIG. 11 illustrates another method of forming an electrochemical cell in accordance with exemplary embodiments of the disclosure.

FIG. 11 illustrates a method 1100 of forming an electrochemical cell, such as cell 800. Method 1100 includes the steps of placing a combination of a first separator layer, a second electrode layer, and a second separator layer over a first electrode layer (step 1102), folding the first electrode layer over the combination (step 1104), and optionally includes the steps of forming contact to first electrode layer (step 1106) and/or forming contact to second electrode layer (step 1108). Although illustrated as beginning with a first electrode layer, method 110 may begin with the combination, such that the bottom layer is a separator layer; this provides additional cell isolation. Likewise, the method may end with a combination layer on top to provide electrical isolation at the top of the cell. Or, additional separator sections may be formed at the bottom and/or top of the cell to provide the additional cell isolation.

Step 1102 includes placing a combination of second electrode layer and two separator layers over a first first electrode layer section in an orthogonal direction relative to the first electrode layer. The combination of first separator layer, second electrode layer, and second separator layer may be from a single source (e.g., roll, tape, or web) or from separate sources, in which case the separate layers are brought together prior to step 1104. In accordance with one example, first electrode layer is from a continuous source, and second electrode and first and second separator layers are precut to a desired length.

During step 1104, the first electrode layer is folded back over the combination, in a direction orthogonal to the combination, to form a second first electrode section overlying the combination.

Steps 1102-1104 may be performed according to any of the folding and moving technologies described above in connection with methods 300 and 700. The steps may be repeated until a desired number of first electrode sections and combination sections are formed within the cell. The cell may then be flattened to decrease the volume of the cell and to produce flattened regions (e.g., regions 820) suitable for forming contact to first electrode layer.

Contacts to layers 802 and/or 806 are formed during steps 1106 and 1108, which steps may be the same or similar to steps 310, 312 and 708, 710 described above.

The present invention has been described above with reference to a number of exemplary embodiments and examples. It should be appreciated that the particular embodiments shown and described herein are illustrative of the exemplary embodiments of the invention, and are not intended to limit the scope of the invention. It will be recognized that changes and modifications may be made to the embodiments described herein without departing from the scope of the present invention. These and other changes or modifications are intended to be included within the scope of the invention.

The invention claimed is:

1. A method of forming an electrochemical cell, the method comprising the steps of:
    placing a separator layer overlying a first section of a first electrode layer, in a direction orthogonal to the first electrode layer;
    folding the separator layer back onto itself to form a first separator section, a second separator section, and a first opening there between;
    folding the first electrode layer over the second separator section to form a first first electrode section underlying the first separator section and a second first electrode section overlying the second separator section;
    placing a first sheet comprising second electrode material within the opening; and
    cutting a folded section of the first electrode layer to form edge sections and forming contact to the first electrode layer.

2. The method of claim 1, further comprising forming an electrochemical cell comprising greater than two of each of: first electrode sections, separator sections, and plates.

3. The method of claim 1, wherein the step of placing a first plate occurs prior to the step of folding the first electrode layer over the second separator section.

4. The method of claim 1, wherein the step of placing the first plate occurs after the step of folding first electrode layer over the second separator section.

5. The method of claim 1, further comprising a step of providing a separator section underlying the first first electrode section.

6. The method of claim 1, further comprising a step of providing a separator section at a top of the electrochemical cell.

7. The method of claim 1, further comprising a step of forming a contact to the first electrode layer through a folded section of the first electrode layer.

8. The method of claim 1, further comprising a step of forming a contact to the second electrode layer on a contact area on a plate.

9. An electrochemical cell comprising:
a first electrode layer comprising a first electrode section;
a second electrode layer overlying the first electrode layer, the second electrode layer comprising a first surface and a second surface comprising active material; and
a separator layer partially overlying the second surface,
wherein a combination of the second electrode layer and the separator layer is folded back over itself in a first direction, the first electrode layer is folded over the combination in a second direction to form a second first electrode section, and wherein the first direction and the second direction are orthogonal each other.

10. The electrochemical cell of claim 9, comprising greater than two of each of: first electrode sections, second electrode sections, and separator sections.

11. The electrochemical cell of claim 9, wherein the second surface is intermittently coated with active material.

12. The electrochemical cell of claim 9, wherein the second electrode layer comprises a contact area.

13. The electrochemical cell of claim 9, wherein the first electrode layer comprises active material on a top surface and on a bottom surface.

14. The electrochemical cell of claim 9 comprising a section of the separator layer at the bottom of the electrochemical cell.

15. The electrochemical cell of claim 9 comprising a section of the separator layer on the top of the electrochemical cell.

16. A method of forming an electrochemical cell, the method comprising the steps of:
placing a combination of a second electrode layer and a separator layer overlying a first first electrode section of a first electrode layer, the combination in a direction orthogonal to the first electrode layer;
folding the combination back onto itself to form a first combination section and a second combination section;
folding the first electrode layer over the second combination section to form a second first electrode section overlying the second combination section; and
cutting a folded section of the first electrode layer to form an edge section and forming contact to a first electrode layer.

17. The method of claim 16, further comprising forming an electrochemical cell comprising greater than two of each of: first electrode sections and combination sections.

18. The method of claim 16, further comprising a step of providing separator material at a bottom of the electrochemical cell.

19. The method of claim 16, further comprising a step of providing separator material at a top of the electrochemical cell.

20. The method of claim 16, wherein the step of placing comprises providing a second electrode layer comprising a substrate and intermittent sections of electrode active material overlying the substrate.

21. The method of claim 16, wherein the step of placing comprises providing a second electrode layer comprising a substrate comprising one or more contact areas.

22. The method of claim 16, further comprising a step of forming contact to the second electrode layer.

23. The method of claim 16, further comprising a step of forming contact to the first electrode layer.

24. The method of claim 16, further comprising a step of forming contact to the first electrode layer through a folded section of the first electrode layer.

25. An electrochemical cell comprising:
a first electrode layer;
a second electrode layer overlying the first electrode layer, the second electrode layer comprising a first surface comprising active material and a second surface comprising active material;
a first separator layer partially overlying the first surface; and
a second separator layer partially overlying the second surface,
wherein a combination of the first separator layer, the second electrode layer, and the second separator layer overlays a first first electrode section, and
wherein the first electrode layer is orthogonally folded over the combination to form a second first electrode section.

26. The electrochemical cell of claim 25, wherein the first electrode layer comprises active cathode material and the second electrode layer comprises active anode material.

27. The electrochemical cell of claim 25, wherein the first electrode layer comprises active anode material and the second electrode layer comprises active cathode material.

28. The electrochemical cell of claim 25, comprising greater than two of each of: first electrode sections, second electrode sections, and separator sections.

29. The electrochemical cell of claim 25, wherein the first surface is partially coated with active material.

30. The electrochemical cell of claim 25, wherein the second surface is partially coated with active material.

31. The electrochemical cell of claim 25, wherein a bottom layer of the electrochemical cell comprises separator material.

32. The electrochemical cell of claim 25, wherein a top layer of the electrochemical cell comprises separator material.

33. The electrochemical cell of claim 25, wherein the second electrode layer comprises one or more contact areas.

34. A method of forming an electrochemical cell, the method comprising the steps of:
placing a combination of a first separator layer, a second electrode layer comprising a first surface comprising active material and a second surface, and a second separator layer overlying a first first electrode section of a first electrode layer, in a direction orthogonal to the first electrode layer, wherein the first separator layer partially overlies the first surface and the second separator layer partially overlies the second surface; and
folding the first electrode layer over the combination in a direction orthogonal to the combination.

35. The method of claim 34, comprising forming an electrochemical cell comprising greater than two of each of: first electrode sections and combination sections.

36. The method of claim 34, further comprising a step of providing a separator section underlying the first first electrode section.

37. The method of claim 34, further comprising a step of providing a separator section at a top of the electrochemical cell.

38. The method of claim 34, further comprising a step of forming contact to the first electrode layer.

39. The method of claim 34, further comprising a step of forming contact to the second electrode layer.

40. The method of claim 34, further comprising steps of cutting a folded section of the first electrode layer to form an edge section and forming contact to the first electrode layer.

41. A battery comprising the electrochemical cell of claim 9.

42. A battery comprising the electrochemical cell of claim 25.

43. A process of forming a battery comprising the method of claim 1.

44. A process of forming a battery comprising the method of claim 16.

45. A process of forming a battery comprising the method of claim 34.

\* \* \* \* \*